Nov. 29, 1938.　　　　J. W. SALTER　　　　2,138,409

CLINCH NUT

Filed July 2, 1937

INVENTOR.
JOHN W. SALTER
BY
Kwis Hudson & Kent
ATTORNEYS

Patented Nov. 29, 1938

2,138,409

UNITED STATES PATENT OFFICE 2,138,409

CLINCH NUT

John W. Salter, Kent, Ohio, assignor to The Lamson & Sessions Company, Cleveland, Ohio, a corporation of Ohio Application July 2, 1937, Serial No. 151,691

2 Claims. (Cl. 85—32)

This invention relates to improvements in the method and means of providing perforated metal plates with nuts to be held by the plates against turning when bolts are screwed thereinto.

An object of my invention is to provide an improved nut of the type known as a clinch nut and an improved method for mounting nuts of this type in perforations of metal plates.

Another object of this invention is to provide an improved clinch nut having a shank of novel form and which when secured in the perforation of a metal plate will form a stronger and more reliable connection than has been heretofore obtainable.

The invention may be further briefly summarized as consisting in certain novel steps of procedure, combinations and features of construction hereinafter described and particularly set out in the appended claims.

In the accompanying sheet of drawings.

Figure 1:
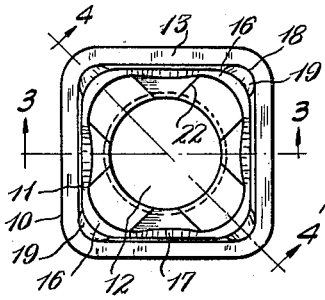
Fig. 1 is an end view of one form of clinch nut embodying my invention.

More detailed reference will now be made to the accompanying drawing which illustrates my novel method and two embodiments of my improved clinch nut, but before proceeding with such detailed description it will be understood, of course, that the drawing is illustrative only and that the invention may be embodied in various other operations and forms of clinch nuts.

Figure 7:
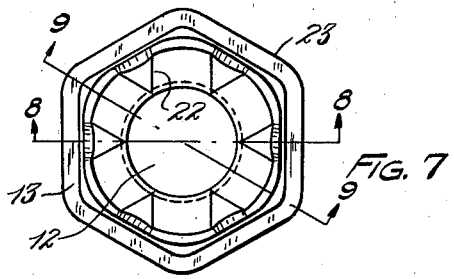
Fig. 7 is an end view of another clinch nut embodying my invention.
Figure 2:
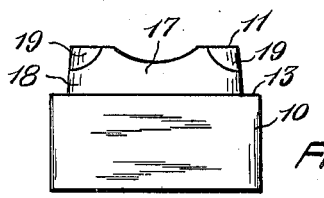
Fig. 2 is a side view thereof.

In Figs. 1 to 4 inclusive I show one form of my improved clinch nut comprising a polygonal shaped nut body 10 and an axially extending shank 11 projecting from one end thereof. The body and shank of the nut shown in this instance are generally square in cross-sectional shape although they may be of hexagonal form, as illustrated in Fig. 7, or may be of any other desired polygonal shape. A longitudinal opening 12 extends through the body and shank of the nut and is internally threaded. At the junction of the shank with the body the nut has a perimetrical shoulder 13 extending around the shank.

Before describing my improved clinch nut more in detail I wish to explain, in a general way, how the nut is intended to be used. For the purpose of this explanation I show, in Figs. 5 and 6, a metal plate 14 having a perforation 15 of polygonal shape, in this instance generally square and slightly larger in size than the shank of the nut. The nut is applied to the plate by inserting the shank 11 thereof into the perforation to cause the shoulder 13 to engage an outer face of the plate. The shank is expanded or riveted and thereby secured in the perforation to retain the nut permanently connected with the plate. When a screw or bolt enters a clinch nut which is mounted on a plate in this manner the nut is held against turning by the engagement of the shank in the polygonal perforation of the plate and the act of screwing the bolt into the nut is thus greatly facilitated.

Figure 3:
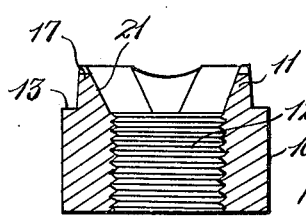
Fig. 3 is a longitudinal section taken through the clinch nut, as indicated by line 3—3 of Fig. 1.
Figure 4:
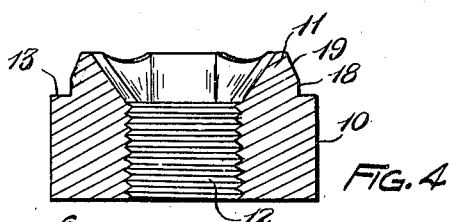
Fig. 4 is another longitudinal section taken through the same nut as indicated by line 4—4 of Fig. 1.

In producing my improved clinch nut I form the shank 11 with corner portions 16 which are of greater length than the intermediate portions 17. These corner portions of the shank are also formed with a rounded external surface 18 near the base of the shank, that is, adjacent the shoulder 13, and are formed to contain an increased body of metal in comparison with the intermediate portion 17, as will be seen from Figs. 3 and 4. I also form an external chamfer 19 on the shank which provides each of the corner portions 16 with somewhat of a bevel or taper between the rounded surface 18 thereof and the end of the shank. Inside the shank the nut opening is formed with a beveled or outwardly inclined face 21, as shown in Figs. 3 and 4 and is left unthreaded. Because of its external chamfer 19 and its internal bevel 21 the wall of the shank is of minimum thickness at its outer end and can be expanded or riveted in the perforation of the plate without damaging the thread of the nut.

My improved clinch nut may be formed by the use of any appropriate dies and apparatus, but I prefer to use dies which are capable of cold-forming the nut from blanks cut from bar or wire stock. The clinch nuts produced by such dies may have lines or marks 22 left thereon by the dies but these lines are relatively indistinct and are unimportant.

Figure 5:
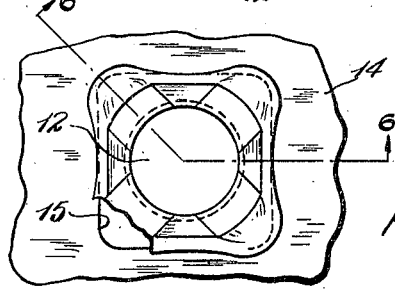
Fig. 5 is a plan view, with portions broken away, showing the clinch nut of Fig. 1 applied to a perforated metal plate.
Figure 6:
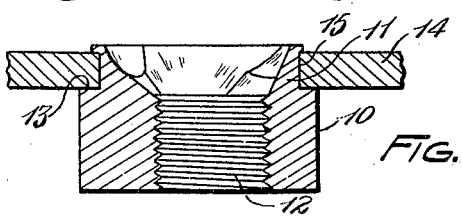
Fig. 6 is a sectional view taken through the nut and plate assembly as indicated by line 6—6 of Fig. 5.

Certain advantages are realized in forming the corner portions 16 of the shank with the rounded surfaces 18 adjacent the base and certain advantages also result from the chamfer 19 formed adjacent the outer end of the shank. One advantage for the rounded corner portions 18 is that they can be formed on the nut with less die pressure and breakage than sharp or square corners. Another advantage is that the plate perforations can have rounded corners and hence can be formed more accurately and with less wear and breakage of the dies. The chamfer 19 on the outer end of the shank facilitates the operation of inserting the shank into the perforation of the plate, and when the outer end of the shank is riveted or expanded to connect the nut with the plate, the chamfer provides a space into which metal of the corner portions can flow during the riveting or expanding operation. In forming the corner portions 16 of the shank of greater length than the intermediate portions 17 I find that the blow which is struck in expanding or riveting the shank acts mainly on the corner portions and causes metal thereof to flow out and fill the corners of the perforation and to overlap the edge of the perforation at and near its corners, as shown in Figs 5 and 6, to produce a secure connection between the nut and plate.

Figure 8:
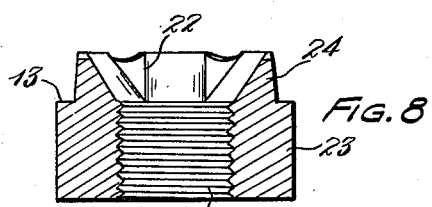
Fig. 8 is a longitudinal sectional view of the nut taken on the line 8—8 of Fig. 7.
Figure 9:
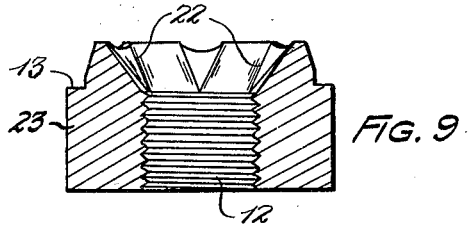
Fig. 9 is another longitudinal sectional view of the nut taken on line 9—9 of Fig. 7.

The clinch nut 23 shown in Figs 7, 8 and 9 embodies the same novel characteristics as the nut 10, but is of hexagonal shape instead of square. This nut is used in the same way as the nut 10, except that the perforation of the plate is formed of generally hexagonal shape to receive the hexagonal shank 24 of the nut.

While I have illustrated and described my improved clinch nut and method of mounting in a somewhat detailed manner, it will be understood, of course, that I do not wish to be limited to the precise structural details and steps of procedure herein disclosed, but regard my invention as including such changes and modifications as do not constitute a departure from the spirit of the invention and the scope of the appended claims.

Having thus described my invention, I claim:

1. A nut of the character described comprising a polygonal-shaped metal body having a tapped opening therein and a polygonal-shaped integral shank projecting from one end thereof with an external perimetrical shoulder adjacent the junction of the shank and body, the corner portions of said shank being longer than the portions intermediate the corners.

2. A nut of the character described comprising a polygonal-shaped metal body having a tapped opening therein but being otherwise solid and also having a polygonal-shaped integral shank projecting from one end thereof with an external perimetrical shoulder formed by the junction of the shank with the body, the corner portions of said shank being rounded externally and also being externally chamfered adjacent the outer end of the shank.

JOHN W. SALTER.